US009866828B1

(12) United States Patent
Higdon et al.

(10) Patent No.: US 9,866,828 B1
(45) Date of Patent: Jan. 9, 2018

(54) VIDEO TIMING TEST EQUIPMENT AND METHODS OF USING THE SAME FOR MEASURING LIGHT INTEGRATION TIME OF A CAMERA

(71) Applicant: The United States of America as Represented by the Secretary of the Navy, Washington, DC (US)

(72) Inventors: James Higdon, Ridgecrest, CA (US); Jason Witzel, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/596,142

(22) Filed: May 16, 2017

(51) Int. Cl.
*H04N 17/00* (2006.01)
(52) U.S. Cl.
CPC .................................. *H04N 17/002* (2013.01)
(58) Field of Classification Search
CPC ...................................................... H04N 17/002
USPC .................................. 348/187, 189, 180–181
See application file for complete search history.

(56) References Cited

U.S. PATENT DOCUMENTS

| | | | | |
|---|---|---|---|---|
| 5,235,416 A * | 8/1993 | Stanhope | ................. | G01S 5/163 348/139 |
| 6,759,814 B2 * | 7/2004 | Vogel | ........................ | G01J 3/10 315/312 |
| 8,860,819 B2 * | 10/2014 | Okincha | ............... | H04N 17/002 348/177 |
| 9,077,961 B1 * | 7/2015 | Saltzman | ............. | H04N 17/002 |
| 9,565,425 B2 * | 2/2017 | Shiohara | ............... | H04N 17/002 |
| 2010/0147952 A1 * | 6/2010 | Carlson | .............. | G06K 7/10752 235/462.41 |
| 2012/0187190 A1 * | 7/2012 | Wang | ................. | G06K 7/10732 235/462.06 |
| 2013/0161392 A1 * | 6/2013 | Goren | ................. | G06K 7/10722 235/455 |
| 2014/0078277 A1 * | 3/2014 | Dai | ..................... | A61B 1/00004 348/68 |
| 2014/0078278 A1 * | 3/2014 | Lei | ..................... | A61B 1/00006 348/68 |

* cited by examiner

*Primary Examiner* — Paulos M Natnael
(74) *Attorney, Agent, or Firm* — Jimmy M. Sauz

(57) ABSTRACT

A video timing test equipment for measuring light integration time of a camera. The video timing test equipment may comprise: a control unit and shutter timing test unit. The control unit may generate input timing signals adjustable by a user. The shutter timing test unit may comprise light emitting diodes (LEDs), infrared light emitting diodes (IR LEDs), and an output controller. The output controller may regulate the illumination of the LEDs and IR LEDs based on the input timing signals. The shutter timing test unit may also comprise a UTC time display, edge time display, and pulse width display. The UTC time display may depict a UTC time as to when light integration begins or ends. The edge time display may depict an offset time associated with the start or end of light integration. The pulse width display may depict the duration of light integration.

20 Claims, 7 Drawing Sheets

VIDEO TIMING TEST EQUIPMENT AND METHODS OF USING THE SAME FOR MEASURING LIGHT INTEGRATION TIME OF A CAMERA

STATEMENT REGARDING FEDERALLY SPONSORED RESEARCH OR DEVELOPMENT

The invention disclosed herein may be manufactured and used by for the government of the United States of America for governmental purposes without the payment of any royalties thereon or therefor.

FIELD

The present disclosure relates generally to test equipment for camera shutter systems and, more particularly, to calibration mechanisms for measuring light integration time of a camera under test, including visible cameras and infrared cameras.

BACKGROUND

In order to support testing and training activities, many open air ranges utilize multiple cameras to capture images in both visible and non-visible spectra. Those cameras are generally used to record a test event and are generally synchronized to a precision time source (e.g., coordinated time source (UTC)) to help create coordination imagery of the test event. The resulting imagery capturing the test event is then preferably fed into image processing software and fused to generate position versus time data or time-space-position information (TSPI) data.

The resulting TSPI data, however, may be susceptible to error and is generally only as precise as the least precise data source used to generate that data. Thus, any improvement to the accuracy of the timing of the camera shutter speeds will likely result in an improvement in the generated TSPI data. The frame rate for some of these cameras can be altered, thereby modifying how often an image frame is recorded for each specific test. But, depending on the manufacturer of each camera device, the timing of the camera shutter may vary, even when using the same input synchronization signal. More importantly, in some cases, the shutter timing might not even conform to the manufacturer-provided specifications. As a result, given the possible shutter timing inconsistencies of the cameras, it might become more difficult or impossible to determine the timing of critical events with a necessary degree of precision.

Therefore, based on the foregoing, a need exists that overcomes these deficiencies. The present disclosure solves the inconsistent shutter timing deficiencies and generally represents a new and useful innovation in the realm of calibration mechanisms for measuring with precision the timing of light integration for cameras.

SUMMARY OF ILLUSTRATIVE EMBODIMENTS

To minimize the limitations in the related art and other limitations that will become apparent upon reading and understanding the present specification, the following discloses a new and useful video timing test equipment and methods of using the same for measuring light integration time of a camera.

One embodiment may be a video timing test equipment for measuring light integration time of a camera under test, comprising: a control unit capable of generating a plurality of input timing signals adjustable by it user; and a shutter timing test unit operatively coupled to the control unit, the shutter timing test unit comprising: a plurality of timing light emitting diodes (LEDs), including: at least one left timing LED, a center timing LED, and at least one right timing LED; and an output controller capable of regulating an illumination of the plurality of timing LEDs generating a plurality of timing LED output signals, each having an offset time occurring sequentially and corresponding to an associated one of the plurality of timing LEDs; wherein the plurality of timing LED output signals may be adjusted by the user based on the plurality of input timing signals and may include a center timing LED output signal associated with the illumination of the center timing LED; and wherein the output controller may be configured to: (i) illuminate the center timing LED based on the offset time of the center timing LED output signal; (ii) illuminate the at least one left timing LED before the illumination of the center timing LED; and (iii) illuminate the at least one right timing LED after the illumination of the center timing LED. The shutter timing test unit may further comprise: a coordinated universal time (UTC) time display in communication with the output controller; a UTC timing module capable of generating a current time signal; and a timing logic capable of generating a center timing LED UTC time matching signal based on the current UTC time signal and the plurality of input timing signals; wherein the output controller may be capable of displaying on the UTC time display a UTC time based on the center timing LED UTC time matching signal, the UTC time corresponding to a UTC start time or a UTC end time of the light integration. The shutter timing test unit may farther comprise: a plurality binary coded decimal (BCD) LEDs in communication with the output controller; and wherein the output controller may be capable of displaying the UTC time in BCD format with the plurality of BCD LEDs. The shutter timing test unit may further comprise: a plurality of BCD infrared light emitting diodes (IR LEDs) in communication with the output controller; wherein the output controller may be capable of displaying the UTC time in BCD format with the plurality of BCD IR LEDs. The shutter timing test unit may further comprise: a user input display logic; and an edge time display in communication with the user input display logic; wherein the user input display logic may be capable of displaying the offset time of the center timing LED on the edge time display based on the plurality of input timing signals. The shutter timing test unit may further comprise: a pulse width display in communication with the user input display logic; wherein the user input display logic may be capable of displaying a pulse width time on the pulse width display based on the plurality of input timing signals. The shutter timing test unit may further comprise: a plurality of timing IR LEDs, including at least one left timing IR LED, a center timing IR LED, and at least one right timing IR LED; wherein the output controller may be capable of regulating an illumination of the plurality of timing IR LEDs based on the plurality of timing LED output signals, such that the output controller may be configured to: (i) illuminate the center timing IR LED based on the offset time of the center timing LED output signal; (ii) illuminate the at least one left timing IR LED before the illumination of the center timing IR LED; and (iii) illuminate the at least one right timing IR LED after the illumination of the center timing IR LED. The control unit may comprise a toggle switch movable between a start position and an end position, the start position being associated with a leading edge of the center timing LED output signal and the end position being associated with a trailing edge of the center timing LED output signal, such that the start position corresponds to a start of light integration and the end position corresponds to an end of the light integration.

Another embodiment may be a video timing test equipment for measuring light integration time of a camera under test, comprising: a control unit capable of generating a plurality of input timing signals adjustable by a user; and a shutter timing test unit operatively coupled to the control unit, the shutter timing test unit comprising: a plurality of timing LEDs, including: at least one left timing LED, a center timing LED, and at least one right timing LED; a timing logic capable of generating a first timing LED start time signal and a pulse width signal, based on the plurality of input timing signals, wherein the first timing LED start time signal may correspond to a start time as to when a first of the plurality of timing LEDs begins to illuminate and wherein the pulse width signal may correspond to a time period for illuminating each of the plurality of timing LEDs; an output controller capable of regulating an illumination of the plurality of timing LEDs by generating a plurality of timing LED output signals, each having an offset time occurring sequentially and corresponding to an associated one of the plurality of timing LEDs, the plurality of timing LED output signals being adjusted based on: (1) the first timing LED start time and (2) the pulse width signal and including a center timing LED output signal associated with the illumination of the center timing LED; wherein the output controller may be configured to: (i) illuminate the center timing LED based on the offset time of the center timing LED output signal; (ii) illuminate the at least one left timing LED before the illumination of the center timing LED; and (iii) illuminate the at least one right timing LED after the illumination of the center timing LED. The shutter timing test unit may further comprise: a UTC timing module capable of generating a current UTC time signal; and a UTC time display in communication with the output controller; wherein the timing logic may be capable of generating a center timing LED UTC time matching signal based on the current UTC time signal and the plurality of input timing signals; and wherein the output controller may be capable of displaying on the UTC time display a UTC time based on the center timing LED UTC time matching signal, the UTC time corresponding to a UTC start time or a UTC end time of the light integration. The shutter timing unit may further comprise: a plurality of timing IR LEDs, including at least one left timing IR LED, a center timing IR LED, and at least one right timing IR LED; wherein the output controller may be capable of regulating an illumination of the plurality timing IR LEDs based on the plurality of timing LED output signals, such that the output controller may be configured to: (i) illuminate the center timing IR LED based on the offset time of the center timing LED output signal; (ii) illuminate the at least one left timing IR LED before the illumination of the center timing IR LED; and (iii) illuminate the at least one right timing IR LED after the illumination of the center timing IR LED. The shutter timing test unit may further comprise: a plurality of BCD LEDs in communication with the output controller; wherein the output controller may be capable of displaying the UTC time in BCD format with the plurality of BCD LEDs. The shutter timing test unit may further comprise: a plurality of BCD IR LEDs in communication with the output controller; wherein the output controller may be capable of displaying the UTC time in BCD format using the plurality of BCD IR LEDs. The shutter timing test unit may further comprise: a user input display logic; and an edge time display in communication with the user input display logic; wherein the user input display logic may be capable of displaying the offset time of the center timing LED on the edge time display based on the plurality of input timing signals. The shutter timing test unit may further comprise: a pulse width display in communication with the user input display logic; wherein the user input display logic may be capable of displaying a pulse width time on the pulse width display based on the plurality of input timing signals. The control unit may comprise a toggle switch movable between a start position and an end position, the start position being associated with a leading edge of the center timing LED output signal and the end position being associated with a trailing edge of the center timing LED output signal, such that the start position corresponds to a start of light integration and the end position corresponds to an end of the light integration.

Another embodiment may be a method for measuring light integration time of a camera under test with a video timing test equipment, comprising: providing a video timing test equipment having a control unit and a shutter timing test unit; wherein the control unit may be capable of generating a plurality of input timing signals adjustable by a user and may comprise: (1) a toggle switch and (2) at least one rotary control knob; wherein the toggle switch may be selectable between a start of light integration and an end of light integration and wherein the at least one rotary control knob may be used to adjust an offset time of the start and the end of light integration; wherein the shutter timing test unit may be operatively coupled to the control unit and may comprise: a plurality of timing LEDs, including: at least one left timing LED, a center timing LED, and at least one right timing LED; and an output controller capable of regulating an illumination of the plurality of timing LEDs by generating a plurality of timing LED output signals, each having an offset time increasing successively and corresponding to an associated one of the plurality of timing LEDs, the plurality of timing LED output signals being adjusted based on the plurality of input timing signals and includes a center timing LED output signal associated with the illumination of the center timing LED; wherein the output controller may be configured to: (i) illuminate the center timing LED based on the offset time of the center timing LED output signal; (ii) illuminate at least one left timing LED before the illumination of the center timing LED; and (iii) illuminate the at least one right timing LED after the illumination of the center timing LED; positioning the shutter timing test unit in view of a camera under test, such that, a monitor in video communication with the camera under test may display a video image of the timing LEDs of the shutter timing test unit; adjusting the toggle switch of the control unit to select the start of light integration; and, while viewing the timing LEDs on the monitor, adjusting the at least one control knob of the control unit until the at least one left timing LED stops illuminating and the center timing LED illuminates in order to measure the start of the light integration. The method may further comprise the steps: adjusting the toggle switch of the control unit to select the end of the light integration; and, while viewing the timing LEDs on the monitor, adjusting the at least one control knob of the control unit until the at least the center timing LED illuminates and the at least one right timing LED stops illuminating in order to determine the end of light integration. The shutter timing test unit may further comprise a UTC time display; wherein the UTC time display may depict a UTC start time when selecting the start of the light integration with the control unit; and wherein the method may further comprise the steps: adjusting the toggle switch of the control unit to select the start of light integration; and verifying that a UTC time overlay displayed on the monitor and generated by the camera under test is substantially identical to the UTC start time depicted on the UTC time display of the shutter timing test unit. The UTC time display may depict a UTC end time when selecting the end of light integration with the control unit; and wherein the method may further comprise the steps: adjusting the toggle switch of the control unit to select the end of light integration; and verifying that a UTC time overlay displayed on the monitor and generated by the camera under test is substantially identical to the UTC end time depicted on the UTC time display of the shutter timing test unit.

In one embodiment, the current time signal may be modulated with time data according to Inter Range Instrumentation Group (IRIG) code. The control unit may comprise a toggle switch movable between a start position and an end position, the start position corresponding to a start of light integration and the end position corresponding to an end of the light integration.

It is an object to provide video timing test equipment and methods for using the same for measuring and verifying the exact shutter time and speed of each camera (i.e., visible and infrared cameras) to the nearest microsecond for frame rates up to 1,600 frames per second.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

DETAILED DESCRIPTION OF ILLUSTRATIVE EMBODIMENTS

Figure 1:
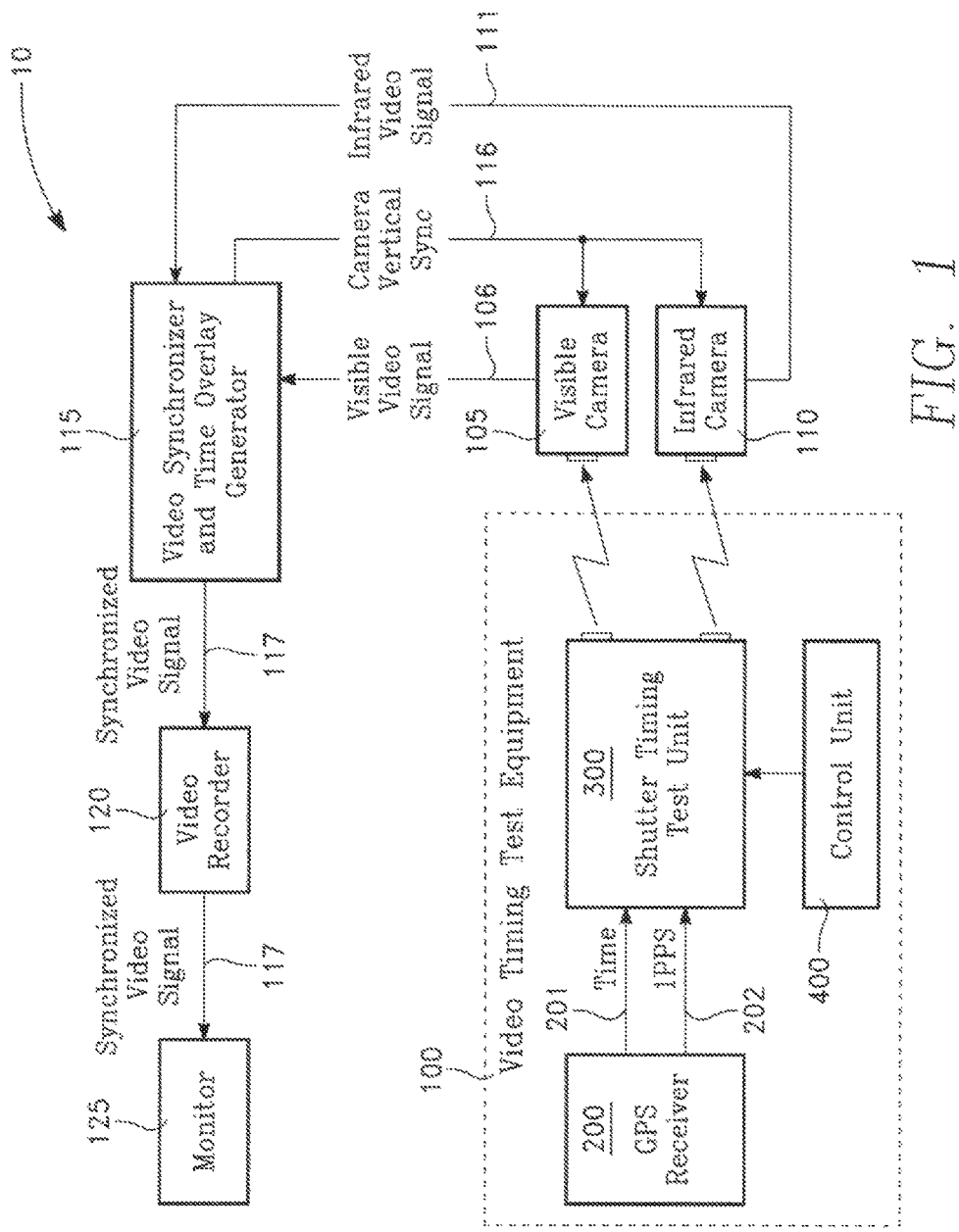
FIG. 1 is an illustration of a test setup for one embodiment of the video timing test equipment for measuring light integration time of a camera under test.

In the following detailed description, numerous specific details are set forth in order to provide a thorough understanding of various aspects of one or more embodiments of the video timing test equipment. However, these embodiments may be practiced without some or all of these specific details. In other instances, well-known methods, procedures, and/or components have not been described in detail so as not to unnecessarily obscure aspects of these embodiments.

While multiple embodiments of the video timing test equipment are disclosed, still other embodiments will become apparent to those skilled in the art from the following detailed description. As will be realized, the following embodiments of the video timing test equipment may be capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of the disclosure.

Before the embodiments are disclosed and described, it is to be understood that this these embodiments are not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should also be understood that some of the functional units described in this specification might have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment", "an embodiment", or "another embodiment" may mean that a particular feature, structure, or characteristic described in connection with the embodiment may be included in at least one embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc . . . , to provide a thorough understanding of the embodiments. One skilled in the relevant art will recognize, however, that the scope of protection can be practiced without one or more of the specific details, or with other methods, components, materials, etc . . . . In other instances, well-known structures, materials, or operations are generally not shown or described in detail to avoid obscuring aspects of the disclosure.

In the following description, certain terminology is used to describe certain features of one or more embodiments. For example, as used herein, the terms "camera," "visible camera," and "infrared camera" generally refer to an optical device or component capable of acquiring, capturing, and/or recording visual images of an object of interest in the form of image and/or video signals. In other embodiments, a camera may also be used to capture and/or record visual images in the form of photographs and film.

As used herein, the terms "application", "software", or "software application" generally refer to any set of machine-readable instructions on a client machine, web interface, and/or computer system, that directs a computer's processor to perform specific steps, processes, or operations disclosed herein.

As used herein, the term "display" refers to display elements including but not limited to seven-segment displays, light emitting diodes (LEDs), or the like.

As used herein, the term "pulse width" refers to the amount of time, within a period of a signal (e.g., digital pulse width modulation voltage signal), that the value of the signal is above or below a reference value (e.g., electrical ground).

As used herein, the singular forms "a" and "the" may include plural referents, unless the context clearly dictates otherwise. Thus, for example, reference to a "display", "UTC time display", "edge time display", or "pulse width time display" can include reference to one or more of such displays.

The present disclosure is directed to video timing test equipment for accurately measuring the start time and end time of light integration for cameras, including visible cameras and infrared cameras. In general, the video timing test equipment may utilize a camera or video recorder, preferably with single frame step, to measure the accuracy of video overlay and metadata time stamp. In one embodiment, the video timing test equipment may utilize a global positioning system (GPS) coordinate universal time (UTC) time message signal along with a one pulse per second (1 PPS) output signal to generate a timing accuracy of approximately one microsecond. Preferably, the timing accuracy is expressed through the use of light emitting diodes (LEDs) and infrared (IR) LEDs, which may be synchronized to a video frame rate signal. Thus, various embodiments of the video timing test equipment may utilize high speed LEDs (i.e., switching within 0-100 nanoseconds).

In various embodiments, the video timing test equipment may comprise three components: (1) shutter timing test unit, (2) a control unit, and (3) a GPS receiver for generating the UTC time message signal. In some embodiments, the GPS receiver may be internal to or integrated with the shutter timing test unit or control unit, but may be a separate independent device. Similarly, in other embodiments, the shutter timing test unit and control unit may be integrated as a single device or may be separate independent devices.

The shutter timing test unit generally serves as a calibration timing display unit and may comprise three major components: (i) timing LEDs for measuring the integration time of a light sensor of a camera, (ii) digital display (e.g., seven segment displays) or LED display for displaying UTC time, and (iii) various indicators and displays for showing edge time, pulse width, frame rate, and offset time.

The control unit may be used generate input timing signals, and these input timing signals may be adjustable by a user. Importantly, the input timing signals may be used to synchronize the timing of the LEDs with the start and end times of light integration.

When measuring the start of light integration, the user may adjust the offset time or edge time in one microsecond steps until (1) the center timing LED illuminates and (2) timing LED just to the left of the center timing LED extinguishes. Here, the UTC time portion of the display may be locked to the exact time when the center timing LED first illuminates, so that the UTC time is stable on the recording for the entire video frame for any integration time selected for the camera.

On the other hand, when measuring the end of light integration, the user may adjust the offset time or edge time in one microsecond steps until (1) the center timing LED illuminates and (2) the timing LED just to the right of the center timing LED extinguishes. Here, the UTC time portion of the display may be locked to the exact time when the center timing LED first turns off, so that the UTC time is stable on the recording for the entire video frame for any integration time selected for the camera.

FIG. 1 is an illustration of a test setup for one embodiment of the video timing test equipment for measuring light integration time of a camera under test. A shown in FIG. 1, one embodiment of a test setup 10 may comprise: a video timing test equipment 100, visible camera 105, infrared camera 110, video synchronizer and time overlay generator 115, video recorder 120, and monitor 125. The video timing test equipment 100 may comprise: a GPS receiver 200, shutter timing test unit 300, and a control unit 400.

FIG. 1 shows that the visible camera 105 may be in video communication with the video synchronizer and time overlay generator 115 in order to transmit a visible video signal 106 to the video synchronizer and time overlay generator 115. This may allow the visible camera 105 to transmit visible light images to the video synchronizer and time overlay generator 115. Similarly, FIG. 1 shows that the infrared camera 110 may also be in video communication with the video synchronizer and time overlay generator 115 in order to transmit an infrared video signal 111 to the video synchronizer and time overlay generator 115. This may also allow the infrared camera 110 to also transmit infrared light images to the video synchronizer and time overlay generator 115. Given that both video signals may be transmitted to the video synchronizer and time overlay generator 115, the video synchronizer and time overlay generator 115 may synchronize both of these video signals to create a synchronized video signal 117. The video synchronizer and time overlay generator 115 may also transmit a camera vertical synchronization signal 116 to the visible camera 105 and/or infrared camera 110 in order to help synchronized the infrared video signal 111 and visible video signal 106.

FIG. 1 also shows that the video synchronizer and time overlay generator 115 may output the synchronized video signal 117 to a monitor 125 and/or video recorder 120. This may allow the user to view the video signals captured by the visible camera 105 and infrared camera 110. The user may also record the synchronized video signal 117 with the video recorder 120 for record keeping. Importantly, the use of a video recorder 120 with a single frame step may help measure the accuracy of the video overlay and meta data time stamp (i.e., UTC time). This may be accomplished by having the user compare the meta data time stamp generated by the synchronizer and time overlay generator 115 with the current UTC time obtained from the UPS receiver. Although FIG. 1 shows that a video recorder 120 is used for the test setup 10, the user may create a test setup without a video recorder.

FIG. 1 also shows that the video timing test equipment 100 may comprise three separate units: a GPS receiver 200, a shutter timing test unit 300, and a control unit 400. The GPS receiver 200 may be a typical receiver configured to acquire GPS signals (i.e., a UTC time message 201 and a one pulse per second (1 PPS) GPS signal 202 (e.g., L1 signal)) and may be configured to output those signals to the shutter timing test unit 300. The GPS signals may also be used to determine UTC time information.

The control unit 400 may be a control interlace that allows a user to select various timing inputs for the video timing test equipment 100. In particular, when using the control unit 400, the user may select and adjust the timing and frame rate (i.e., frequency) of the illumination of the shutter timing test unit's 300 light emitting diodes (LEDs) and infrared light emitting diodes (IR LEDs). For example, in one embodiment, the user, when using the control unit 400, may select the frame rate, start/end of light integration time, timing of the illumination of the LEDs and the offset timing of the illumination of the centermost LED from the vertical video frame. In various embodiments, the control unit 400 may also allow the user to adjust the resolution timing such as 100, 10, and 1 microsecond units. As a result, the control unit 400 may generate and transmit multiple input timing signals to the shutter timing test unit 300.

FIG. 1 also shows that the video timing test equipment 100 may comprise a shutter timing test unit 300. The shutter timing test unit 300 may be test equipment, comprising LEDs and IR LEDs and may be used to regulate the illumination of those LEDs and IR LEDs based on the user-inputted selected settings. In this manner, the shutter timing test unit 300 may visually display various timing data configured by the user. Such timing data may include, without limitation, edge time, pulse width time, and UTC time. In various embodiments, the UTC time may be synchronized with the illumination of one or more LEDs, such as timing LEDs, timing IR LEDs, binary coded decimal (BCD) LEDs, and BCD IR LEDs. In a preferred embodiment, the UTC time may be synchronized with the center timing LED and center timing IR LED. Preferably, the shutter timing test unit 300 utilizes high speed LEDs such as LEDs with less than 100 nanosecond switching.

Importantly, FIG. 1 also shows that the video timing test equipment 100 may be positioned within view of the visible camera 105 and/or infrared camera 110. As a result, the user may view the video timing test equipment 100 with the monitor 125 in order to observe the illumination activity of the LED and display components of the shutter timing test unit 300. In particular, the user may be able to view and observe the action of various components of the video timing test equipment 100 such as LEDs (i.e., timing LEDs 320, BCD LEDs 325, timing IR LEDs 330, BCD IR LEDs 335) (all shown in FIGS. 2 and 3) and displays (i.e., UTC time display 305, edge time display 310, pulse width display 315) (all shown in FIGS. 2 and 3). Thus, by adjusting the timing inputs generated by the control unit 400 and observing the LED and display components of the shutter timing test unit 300, the user may be able to synchronize the timing of the video frame rate signal with the illumination of the LEDs and IR LEDs in order to measure light integration time. Moreover, as recited above, the user may be able to verify the UTC time generated by the visible camera 105 and infrared camera 110 by comparing the UTC time overlay displayed on the monitor 125 (created by the video synchronizer and time overlay generator 115) with the actual UTC time obtained from the GPS receiver 200. Additional details as to how to measure light integration and verify UTC time are discussed below.

Although FIG. 1 shows that the video timing test equipment 100 may comprise three separate units (i.e., the GPS receiver 200, shutter timing test unit 300, and a control unit 400), various embodiments of the video timing test equipment may comprise one, two, or three standalone devices. For example, in one embodiment of the video timing test equipment, the GPS receiver 200, shutter timing test source 300, and a control unit 400 may be integrated as a single unit or device. On the other hand, another embodiment of the video timing test equipment may comprise two standalone devices. For instance, in one embodiment, the video timing test equipment may be two separate devices: (1) control unit and (2) the GPS receiver and shutter timing test unit as a single standalone device. Alternatively, another embodiment of the video timing test equipment may be two different devices: (1) the GPS receiver and (2) the shutter timing test unit and control unit as a single standalone device.

Figure 2:
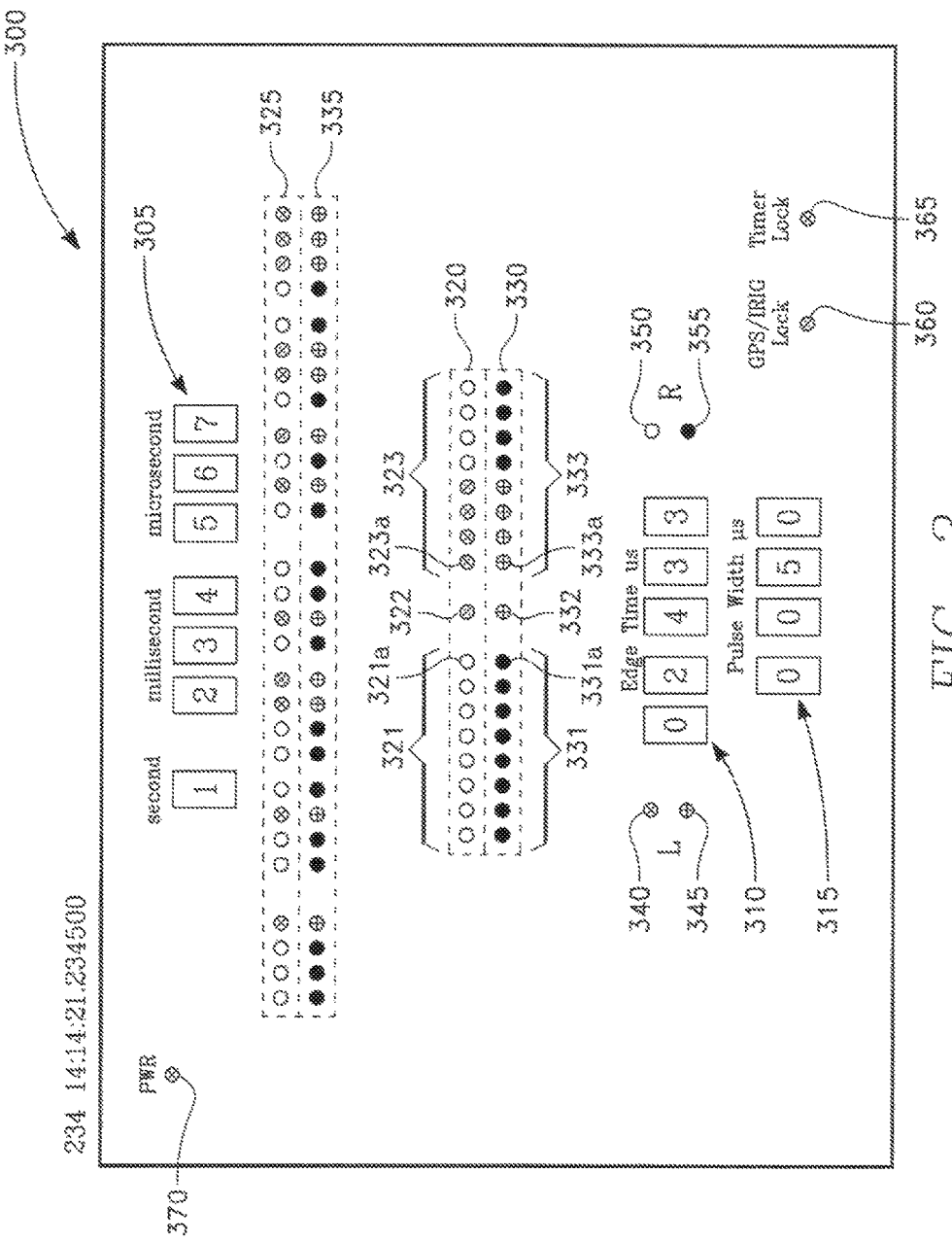
FIG. 2 is an illustration of one embodiment of a shutter timing test unit as depicted on a video monitor and shows the shutter timing test unit at the beginning of light integration.

FIG. 2 is an illustration of one embodiment of a shutter timing test unit as depicted on a video monitor and shows the shutter timing test unit at the beginning of light integration. As shown in FIG. 2, one embodiment of the shutter timing test unit 300 may comprise: a UTC time display 305, an edge time display 310, a pulse width display 315, timing LEDs 320, BCD LEDs 325, timing IR LEDs 330, BCD IR LEDs 335, a start edge select LED indicator 340, a start edge select IR LED indicator 345, an end edge select LED indicator 350, an end edge select IR LED indicator 355, a GPS/IRIG lock indicator 360, a timer lock indicator 365, and a power indicator 370. Additionally, the timing LEDs 320 may include: left timing LEDs 321, a center timing LED 322, and right timing LEDs 323. The timing IR LEDs 330 may include: left timing IR LEDs 331, a center timing IR LED 332, and right timing IR LEDs 333.

The UTC time display 305 may be or more alphanumeric display devices (e.g., seven segment displays) configured to depict UTC time from 0.000,000 seconds to 9.999,999 seconds and may include various time units, such as seconds, milliseconds, and/or microseconds. Importantly, the UTC time display 305 preferably displays a UTC time that is synchronized or locked with the timing of the illumination of the center timing LED 322 and center timing IR LED 332. Thus, when the center timing LED 322 and center timing IR LED 332 begin illuminating, the UTC time depicted on the UTC time display 305 should match with the UTC time overlay 335 displayed in the monitor 125. This may depend on whether an LED and IR LED adjacent to the center timing LED 322 and center timing IR LED 332 also illuminate (i.e., a left timing LED 321*a*, left timing IR LED 331*a*, right timing LED 323*a*, right timing IR LED 333*a*). In this manner, the user may verify that the data of the UTC time overlay 335 generated from the video synchronizer and time overlay generator 115 matches with the current UTC time and actual time the camera is gathering light, which is the beginning of light integration.

The edge time display 310 may be one or more alphanumeric display devices (e.g., seven segment displays) configured to depict an offset time associated with a leading edge or a trailing edge of one or more input timing signals. This offset time may also be synchronized with the illumination of the center timing LED 322 and center timing IR LED 332 from the vertical frame and may be depicted in microseconds.

The pulse width display 315 may be one or more alphanumeric display devices (e.g., seven segment displays) configured to characterize the length of the pulse width of one or more input timing signals. The pulse width may refer to the period of time or duration at which the signal is above or below a reference value such as electrical ground and thus may control the length or duration of the illumination of the timing LEDs 320 and timing IR LEDs 330. FIG. 2 shows that, in one embodiment, the pulse width display 315 may express the pulse width in microseconds.

The timing LEDs 320 may be a group of LEDs capable of emitting visible light the for purposes of measuring the start or end of light integration of a camera's light sensor. The timing LEDs 320 may include: one or more left timing LEDs 321, a center timing LED 322, and one or more right timing LEDs 323 and may emit visible light a consecutive and successive pattern based on the positions of each adjacent timing LED 320. In particular, the shutter timing test unit 300 may generate multiple timing LED output signals, and each timing LED output signal may correspond to a particular timing LED 320. Importantly, as shown in FIG. 7, the timing LED output signals may each comprise a pulse width waveform, and each pulse width waveform may occur sequentially and consecutively, such that one or more timing LEDs 320 emit visible light successively and adjacently. For example, in one embodiment, the shutter timing test unit 300 may emit five LED output signals, each of which may comprise a pulse width waveform in successive timing offsets. Thus, the five LED output signals may then be used to successively illuminate five timing LEDs 320.

Similarly, the timing IR LEDs 330 may also be a group of IR LEDs capable of emitting infrared light for purposes of measuring the start or end of light integration of an infrared camera's light sensor. Thus, unlike the timing LEDs 320, which are adapted to emit visible light, the timing IR LEDs 330 may be adapted to emit infrared light visible to the infrared camera 110. The timing IR LEDS 330 may include: one or more left timing IR LEDs 331, a center timing IR LED 332, and one or more timing IR LEDs 333 and may emit infrared light in a consecutive and successive pattern based on the positions of each adjacent timing IR LED 330. In particular, the shutter timing test unit 300 may generate multiple timing LED output signals, and each timing LED output signals may correspond with a particular timing IR LED 330. Importantly, as shown in FIG. 7, the timing LED output signals may each comprise a pulse width waveform occurring sequentially and consecutively, such that each adjacent timing IR LED 330 emits infrared light successively and adjacently. For example, in one embodiment, the shutter timing test unit 300 may emit five LED output signals, each of which may comprise a pulse width waveform in successive timing offsets. Thus, the five LED output signals may then be used to successively illuminate five timing IR LEDs 330.

It is important to note that, in preferred embodiments, the sequence of infrared light emissions by the timing IR LEDs 330 may be identical to the sequence of visible light emissions by the timing LEDs 320. That way, the UTC time depicted on the UTC time display 305, reference edge time value depicted on the edge time display 310, and pulse width value depicted on the pulse width display 315 may synchronize with the light emissions of the center timing LED 322 and center timing IR LED 332.

FIG. 2 also shows that the shutter timing test unit 300 may comprise BCD LEDs 325 and BCD IR LEDs 335. The BCD LEDs 325 and BCD IR LEDs 335 may be a group of LEDs and IR LEDs capable of depicting UTC time in BCD format. In particular, the BCD LEDs 325 and BCD IR LEDs 335 may depict in BCD format the UTC time display on the UTC time display 305. For example, as shown in FIG. 2, BCD LEDs 325 and BCD IR LEDs 335 may show the UTC time as 1.234,567 seconds.

The UTC time display 305, edge time display 310, and pulse width display 315 are generally human readable devices that must be activated well before the illuminations of the center timing LED 322 and center timing IR LED 332. Therefore, the time associated with the illuminations of the center timing LED 322 and center timing IR LED 332 may be pre-computed and latched into a display driver when the left timing LEDs 321 and left timing IR LEDs 331 are first lit. In this manner, the BCD LEDs 325 and BCD IR LEDs 335 may then be illuminated and gated onto a bus at the time when the center timing LED 322 and center timing IR LED 332 are lit.

Furthermore, FIG. 2 shows that the shutter timing test unit 300 may comprise a GPS/IRIG lock indicator 360, a timer lock indicator 365, and a power indicator 370. The GPS/IRIG lock indicator 360 may illuminate when an IRIG time code signal is applied. The timer lock indicator 365 may illuminate when the shutter timing test unit 300 is locked to a UTC carrier signal. The power indicator 370 may illuminate to indicate when the shutter timing test unit 300 is on.

Finally, FIG. 2 shows the shutter timing test unit 300 at the beginning or start of light integration. In order to accurately measure the beginning of light integration, the user may select the left edge or leading edge of the edge select switch 410 (shown in FIG. 4), which may be a toggle switch on the control unit 400. As a result, the UTC time depicted on the time display 305 may be synced to the moment when the center timing LED 322 and center timing IR LED 332 first illuminate. The user may also adjust the other settings on the control unit 400 as FIG. 4. In particular, the user may adjust the offset time in single microsecond steps until: (1) the center timing LED 322 and center timing IR LED 332 illuminate; (2) the left timing LED 321*a* adjacent to the center timing LED 322 does not illuminate, and (3) the left timing IR LED 331*a* adjacent to the center timing IR LED 332 does not illuminate. At this time, both the start edge select LED indicator 340 and a start edge select IR LED indicator 345 may illuminate, thereby confirming that the leading edge of a pulse signal is selected for measuring the start of light integration. The UTC time shown in the UTC time display 305 may also be synchronized to the leading edge of that pulse signal at this time—that is, when: (1) the center timing LED 322 and center timing IR LED 332 illuminate; (2) the left timing LED 321*a* adjacent to the center timing LED 322 does not illuminate, and (3) left timing IR LED 331a adjacent to the center timing IR LED 332 does not illuminate. Thus, as the left timing LED 321a and the left timing IR LED 331a illuminate, the UTC time depicted on the UTC time display 305 may be stable during the recording for the entire video frame for any light integration time selected for the camera.

Figure 3:
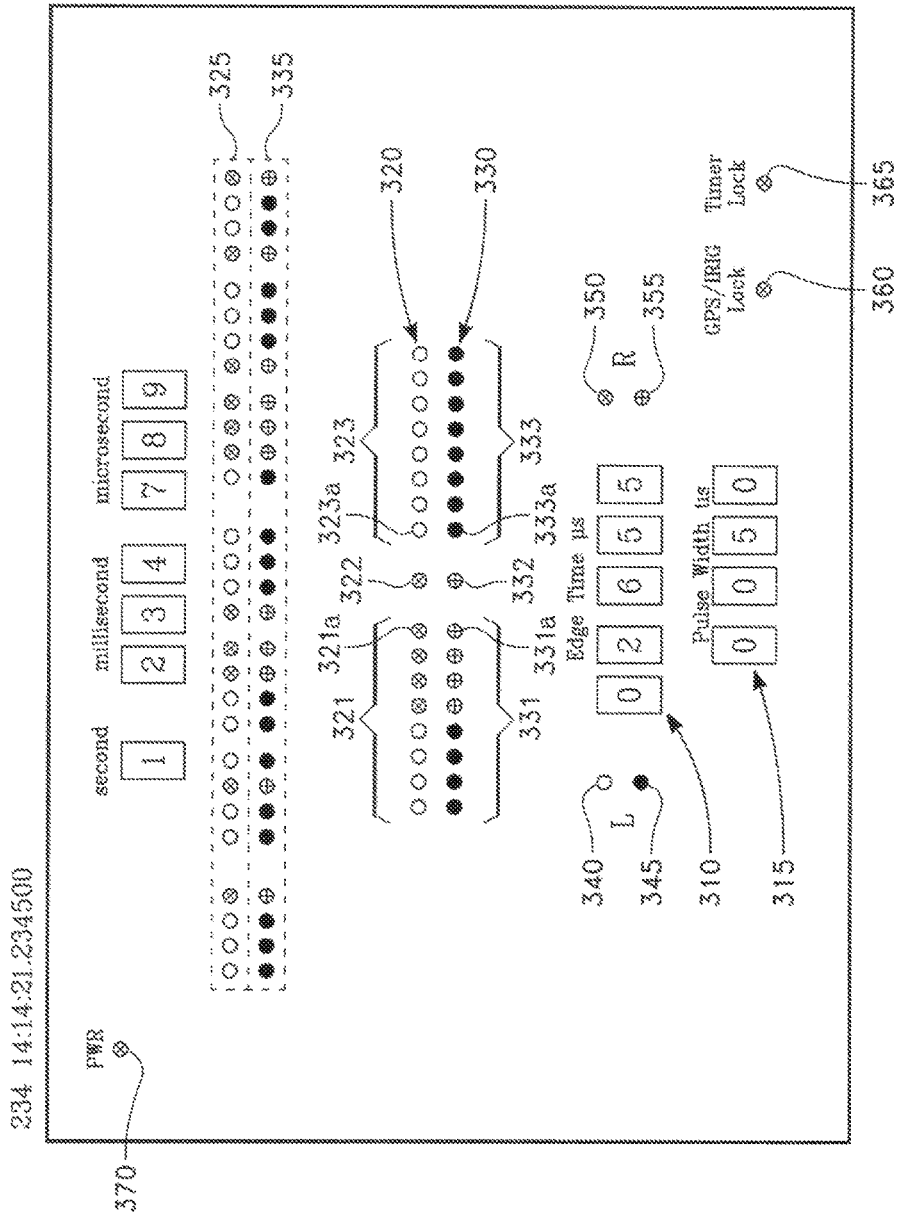
FIG. 3 is an illustration of one embodiment of a shutter timing test unit as depicted on a video monitor and shows the shutter timing test unit at the end of light integration.
Figure 5:
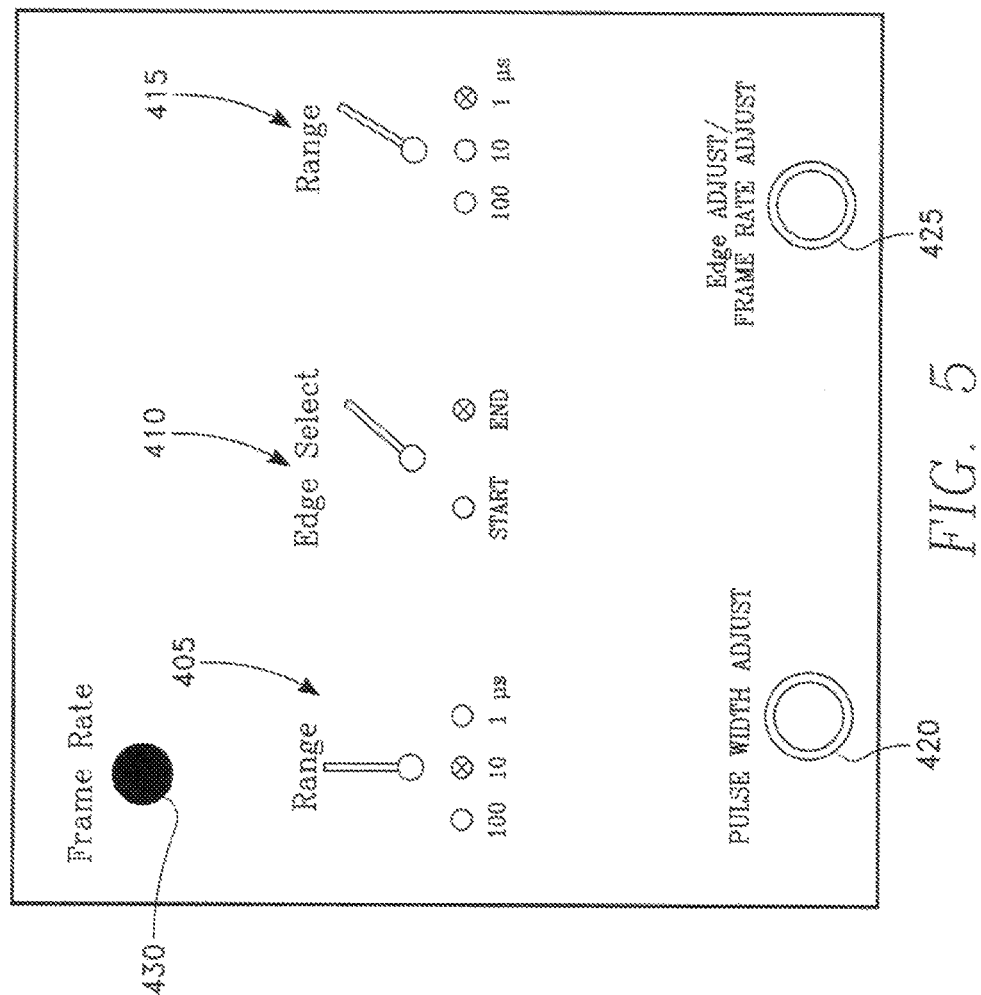
FIG. 5 is an illustration of one embodiment of a control unit and shows how the settings of the control unit would be adjusted in order to measure the end of light integration.

FIG. 3 is an illustration of one embodiment of a shutter timing test unit as depicted on a video monitor and shows the shutter timing test unit at the end of light integration. In order to measure the end of light integration, the user may select the right edge or trailing edge of the edge select switch 410, which may be a toggle switch on the control unit 400. As a result, the UTC time depicted on the UTC time display 305 may be synced to the time when the center timing LED 322 and center timing IR LED 332 stops illuminating. The user may also adjust the settings on the control unit 400 as shown in FIG. 5. In particular, the user may adjust the offset tune in single microsecond steps until: (1) the center timing LED 322 and center timing IR LED 332 illuminate; (2) the right timing LED 323a adjacent to the center timing LED 322 does not illuminate, and (3) right timing IR LED 333a adjacent to the center timing IR LED 332 does not illuminate. At this time, both the end edge select indicator 350 and end edge select IR LED indicator 355 may illuminate, thereby confirming that the trailing edge of a pulse signal is selected for the measurement of the end of light integration. The UTC time shown in the UTC time display 305 may also be synchronized to the trailing edge of that pulse signal at this time—that is, when: (1) the center timing LED 322 and center timing IR LED 332 illuminate; (2) the right timing LED 323a adjacent to the center timing LED 322 does not illuminate, and (3) right timing IR LED 333a adjacent to the center timing IR LED 332 does not illuminate. Thus, as the right timing LED 323a and the right timing IR LED 333a illuminate, the UTC time depicted on the UTC time display 305 may be stable during the recording for the entire video frame for any light integration time selected the camera.

Figure 4:
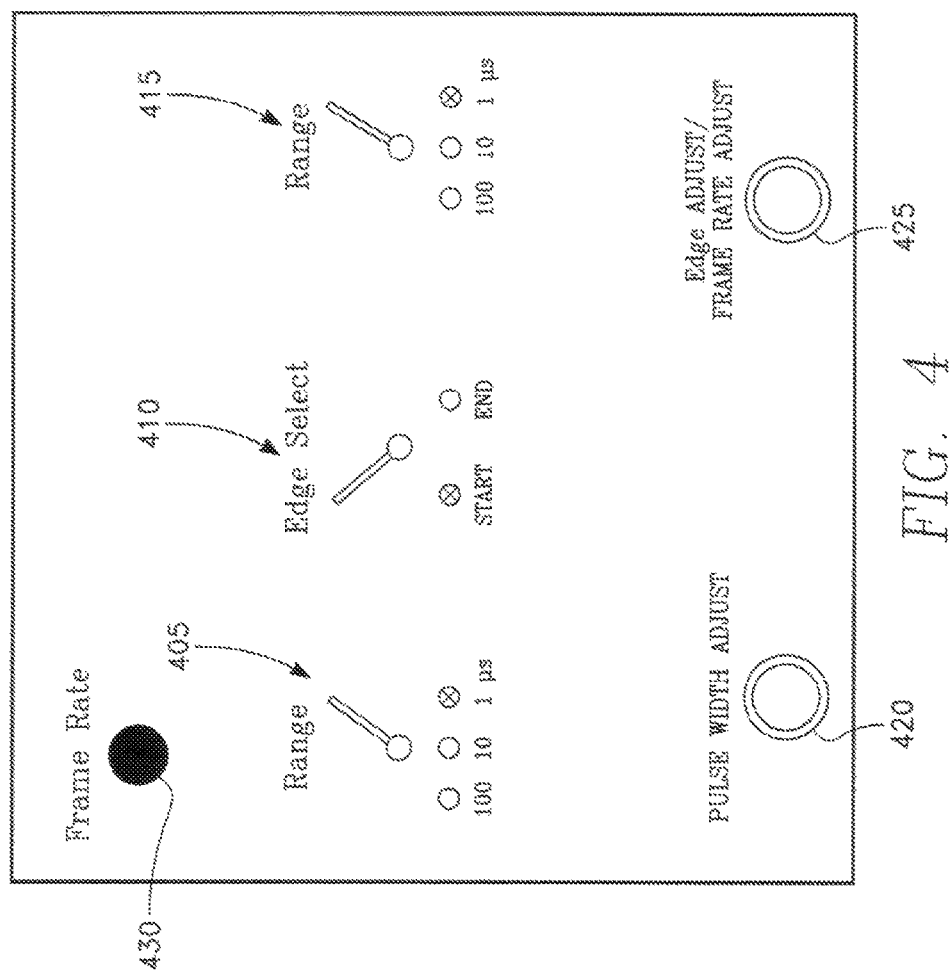
FIG. 4 is an illustration of one embodiment of a control unit and shows how the settings of the control unit would be adjusted in order to measure the start of light integration.

FIG. 4 is an illustration of one embodiment of a control unit and shows how the settings of the control unit would be adjusted in order to measure the start of light integration. As discussed above, the control unit 400 may be configured to send input timing signals to the shutter timing test unit 300. In this manner, the user may adjust the timing and frame rate (i.e., frequency) of the illumination of the LEDs (i.e., timing LEDs 320, BCD LEDs 325, timing IR LEDs 330, BCD IR LEDs 335) and displays (i.e., UTC time display 305, edge time display 310, pulse width display 315). Thus, by (1) adjusting the timing and frequency of the illumination of the LEDs and displays and (2) viewing the LEDs and displays through the monitor 125, the user may be able to measure the beginning, end, and duration of light integration of the camera(s) focusing on the shutter timing test unit 300.

Importantly, FIG. 4 shows that the input timing signals may be adjusted by the user through the use of various toggle switches, buttons, and control knobs. For example, as shown in FIG 4., one embodiment of the control unit 400 may comprise: timing range switches 405, 415, an edge select switch 410, a pulse width adjustment knob 420, an edge and frame rate adjustment knob 425, and a frame rate push button 430.

The pulse width adjustment knob 420 may be a rotary control knob used to adjust the pulse width of one or more input timing signals in order to increase or reduce the on-time lighting period of the LEDs and IR LEDs (i.e., number of microseconds that each timing LED and IR LED remains on). Specifically, the rotation of the pulse width adjustment knob 420 may cause a pulse generator (not shown) to be adjusted for producing one or more signals with a pulse width that preferably extends from the time when light integration begins until the time when light integration ends. Thus, by rotating and adjusting the pulse width adjustment knob 420, the amount of time for each LED to remain lit may be shortened or lengthened, as desired.

In one implementation, multiple LEDs and IR LEDs may illuminate within the field of view of the visible camera 105 and infrared camera 110. Thus, when a user views the LEDs and IR LEDs of the shutter timing test unit 300 through the monitor 125, the user may measure the duration of light integration time simply by adjusting the pulse with adjustment knob 420 until the on-time lighting period of the LEDs and/or displays is synchronized with the camera's sensor shutter time. This may occur when (1) the center timing LED 322 and center timing IR LED 332 illuminate and (2) the LEDs adjacent the center timing LED 322 and center timing IR LED 332 does not illuminate (e.g., left timing LED 321a, left timing IR LED 331a, right timing LED 323a, right timing IR LED 333a). Once the pulse width adjustment knob 420 is calibrated to have the LEDs' illumination synchronized with the camera's sensor shutter time, the user may read the pulse width display 315 to measure the duration of light integration time. As such, the pulse width adjustment knob 420 may be used to measure the duration of light integration time to the nearest microsecond.

Similarly, the edge and frame rate adjustment knob 425 may also be a rotary control knob used to adjust the timing of a signal edge (i.e., leading edge, trailing edge) for one or more input timing signals. Specifically, by rotating the edge and frame rate adjustment knob 425, the offset time of a leading edge or trailing edge of a pulse may shift earlier or later, as desired. In this manner, a user may advance or delay the timing of that signal edge relative to the camera's vertical synchronization signal 116 in order to measure the beginning or end of light integration time of a camera's shutter sensor.

In one implementation, multiple timing LEDs 320 and timing IR LEDs 330 may light consecutively and in succession within the field of view of the visible camera 105 and/or infrared camera 110. Thus, when a user views the illumination of the timing LEDs 320 and timing IR LEDs 330 through the monitor 125, light integration time may be measured by aligning the illumination of the LEDs with the centermost LED (i.e., the center timing LED 322 and center timing IR LED 332). This is due to the fact that, as recited above, the UTC time shown in the UTC time display 305 and the offset time shown in the edge time display 310 are preferably synchronized with the center timing LED 322 and center timing IR LED 332. As a result, the beginning or end of light integration time may be accurately measured by adjusting the edge and frame rate adjustment knob 425 until at least when the center timing LED 322 and center timing IR LED 332 illuminate. For instance, a user may measure the beginning of light integration by: (1) aligning the leading edge of the pulse signal with the illumination of the center timing LED 322 and center timing IR LED 332 and (2) extinguishing the illumination of the left timing LED 321a and left timing IR LED 331a. On the other hand, when measuring the end of light integration time, a user may: (1) align the trailing edge of the pulse signal with the illumination of the center timing LED 322 and center timing IR LED 332 and (2) extinguishing the illumination of the right timing LED 323a and right timing IR LED 333a.

Importantly, upon activating frame rate push button 430, a user may also adjust the frequency of the illumination when adjusting the edge and frame rate adjustment knob 425. This may allow a user to measure the frame rate of the camera under test. By way of example, in order to measure the frame rate of the camera, the user may actuate the frame rate push button 430 and adjust the edge and frame rate adjustment knob 425 until the user is able to read the numerical values on the UTC time display 305, edge time display 310, or pulse width display 315.

In an embodiment, the shutter timing test unit 300 may be configured to enter into a default timing setting affecting the LEDs' and IR LEDs' on-time duration whenever the frame rate push button 430 is actuated. This may allow the LEDs' and IR LEDs' on-time illumination to cover the entire duration or a single vertical frame. In this manner, the on-time duration of at least one LED and IR LED may be activated, and the user may be able to quickly locate when light integration time occurs in the video frame. In particular, when viewing the LEDs or IR LEDs through the monitor 125, the user can simply view the LEDs and IR LEDs of the shutter timing test unit 300 and adjust the offset and on-time illumination to move the first/last LED/IR LED towards the center LED/IR LED.

The edge select switch 410 may be a toggle switch used to select between a leading edge or trailing edge of the pulse signal, and thus, may be used to select the start time or end time of light integration mode.

The timing range switches 405, 415 may be switches or control knobs used to adjust the resolution or units of measure for the pulse width adjustment knob 420 or edge and frame rate adjustment knob 425. The timing range switches 405, 415 may also be used to adjust the frequency at which the LEDs, IR LEDs, and displays illuminate consecutively. For instance, as shown in FIG. 4, one embodiment of the timing range switch 415 may have three adjustable positions (i.e., 100, 10, and 1 microseconds). This may show the user to adjust the resolution or units of measure of the pulse width adjustment knob 420 or edge and frame rate adjustment knob 425 to either 100, 10, or 1 microseconds.

More importantly, in order to measure the start of light integration, a user may adjust the settings on the control unit as shown in FIG. 4. Specifically, a user may configure the video timing test equipment 100 to measure the beginning of light integration by selecting the left edge or leading edge of the edge select switch 410. As a result, both the start edge select LED indicator 340 and a start edge select IR LED indicator 345 may illuminate, thereby confirming that the leading edge of the pulse signal is selected for the measurement of the beginning of light integration.

Additionally, in order to accurately measure the exact moment when light integration begins (i.e., noting the UTC time shown in the UTC time display 305 and the offset time shown in the edge time display 310), the user may also adjust the offset time in single microsecond incremental steps until the illumination of the left timing LED 321a (adjacent to the center timing LED 322) and left timing IR LED 331a (adjacent to the center timing IR LED 332) extinguishes. The UTC time shown on the UTC time display 305 may be synchronized with the timing at the beginning of illumination of the center timing LED 322 and center timing IR LED 332, thereby indicating the beginning of light integration time. In a preferred embodiment, the UTC time shown in the UTC time display 305 may be stable through-out the recording for the entire video frame for any light integration time selected for the camera.

FIG. 5 is an illustration of one embodiment of a control unit and shows how the settings of the control unit would be adjusted in order to measure the end of light integration. As shown in FIG. 5, one embodiment of the control unit 400 may comprise: timing range toggle switches 405, 415, an edge select toggle switch 410, a pulse width adjustment knob 420, an edge and frame rate adjustment knob 425, and a frame rate push button 430. In order to measure the end of light integration, a user may adjust the settings on the control unit 400, as shown in FIG. 5. Specifically, a user may begin configuring the video timing test equipment 100 for measuring the end of light integration by selecting the right edge or trailing edge of the edge select switch 410. As a result, the end edge select LED indicator 350 and end edge select IR LED indicator 355 may illuminate, thereby confirming that the trailing edge of the pulse signal is selected for the measurement of the end of light integration.

Additionally, in order to accurately measure the exact moment when light integration ends (i.e., noting the UTC time shown in the UTC time display 305 and the offset time shown in the edge time display 310), the user may also adjust the offset time in single microsecond incremental steps until the illumination of the right timing LED 323a (adjacent to the center timing LED 322) and right timing IR LED 333a (adjacent to the center timing IR LED 332) extinguishes. As discussed above, the UTC time shown on the UTC time display 305 may be synchronized with the timing at the end of illumination of the center timing LED 322 and center timing IR LED 332, thereby indicating the end of light integration time. In a preferred embodiment, the UTC time shown in the UTC time display 305 may be stable throughout the recording for the entire video frame for any light integration time selected for the camera.

Figure 6:
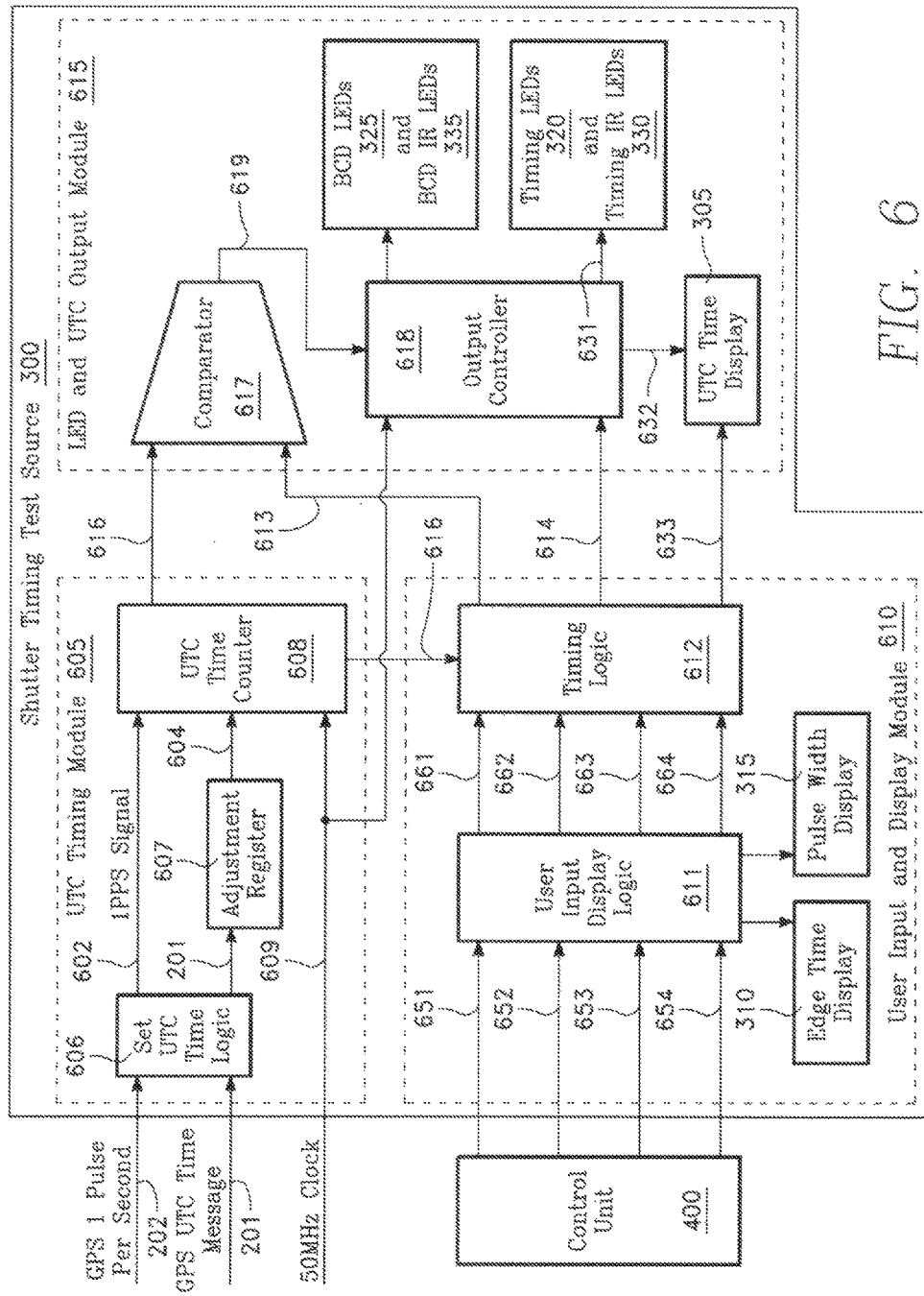
FIG. 6 is a block diagram of the video timing test equipment according to various embodiments of the present disclosure.

FIG. 6 is a block diagram of the video timing test equipment according to various embodiments of the present disclosure. As shown in FIG. 6, one embodiment of the video timing test equipment 100 may comprise: a shutter timing test source 300 and control unit 400. FIG. 6 also shows that the shutter timing test source 300 may also comprise: a UTC timing logic module 605, user input and display module 610, and an LED and UTC output module 615.

The UTC timing logic module 605 may be one or more components or devices configured to generate a current UTC time signal 616 representing the current time UTC format. In one implementation, the UTC timing logic module 605 may comprise: a set UTC time logic 606, an adjustment register 607, and a UTC time counter 608. The set UTC time logic 606 may be an interface logic configured to receive GPS signals (i.e., a one pulse per second (1PPS) GPS signal 602 (e.g., L1 signal) and GPS UTC time message 603) from a typical GPS receiver 200, shown in FIG. 1. The set UTC time logic 606 may also be configured determine the UTC time and provide the following outputs: (1) the 1 PPS GPS signal 602 to the UTC time counter 608 and (2) the GPS UTC time message 603 to the adjustment register 607. In this manner, the adjustment register 607 may latch the UTC time message 603 and output the adjusted UTC set time signal 604, which may be a delay in UTC time to the nearest microsecond due to propagation delay. The adjusted UTC set time signal 604 may then increment the UTC time counter 608 to generate the current UTC time signal 616, which may be synchronized with the 1 PPS signal 602. In various embodiments, a clock signal 609 may also be aligned to the 1PPS signal 602 for correction and improvement towards timing accuracy.

FIG. 6 also shows that the shutter timing test source 300 may also comprise a user input and display module 610. The user input and display module 610 may be configured to receive input timing signals from the control unit 400 and may display some of the user inputs via the edge time display 310 and pulse width display 315. Importantly, the user input and display module 610 may also be configured to generate a pulse width signal 614 and a first timing LED start time signal 613 based on the input timing signals. As recited above, the pulse width signal 614 may control the length or duration of the on-time lighting or illumination of each timing LED 320 and timing IR LED 330. The first timing LED start time signal 613 may transmit LED start time information to the LED and UTC output module 615 for controlling the illumination of the timing LEDs 320 and timing IR LEDs 330.

By way of example, one embodiment of the user input and display module 610 may comprise a user input display logic 611 and timing logic 612. The user input display logic 611 may receive from the control unit 400 various input timing signals configurable by the user. Examples of such input timing signals may include, without limitation, an incremented/decremented pulse width signal 651, incremented/decremented edge time signal 652, start/stop select signal 653, and increment/decrement frame rate signal 654. A summary of the functions for these input timing signals are described below in Table 1.

TABLE 1

| | |
|---|---|
| Incrementeed/Decremented Pulse Width Signal | Controls length of pulse width of a signal |
| Incrementeed/Decremented Edge Time Signal | Controls offset time of the leading edge/trailing edge of a pulse signal |
| Start/Stop Select Signal | Selects betwen leading edge/trailing edge of a pulse signal |
| Incrementeed/Decremented Frame Rate Signal | Controls frequency of illumination for the LEDs and displays |

Upon receiving these input timing signals, the user input display logic 611 may show these user input values on the edge time display 310 and pulse width display 315. Specifically, the edge time display 310 may depict the edge time or offset time at which the illumination of the timing LEDs 320 and timing IR LEDs 330 begins or ends. In particular, the edge time display 310 may depict the offset time at which the timing LEDs 320 and timing IR LEDs 330 begin to illuminate, which is preferably at the start of integration time (i.e., the leading edge). Alternatively, the edge time display 310 may also depict the offset time at which the timing LEDs 320 and timing IR LEDs 330 stop illuminating, which is preferably at the end of integration time (i.e., trailing edge). The pulse width display 315 may show a pulse width time value, indicating the duration at which each of the timing LEDs 320 and timing IR LEDs 3305 illuminate.

In one embodiment, the edge time display 310 may depict the edge time or offset time in microseconds. Similarly, the pulse width display 315 may also depict the pulse width time in microseconds.

The user input display logic 611 may also output various timing signals readable by the timing logic 612, including: an edge selected signal 661, edge time signal 662, pulse width signal 663, and frame rate signal 664. The functionality of these timing signals may be similar to the input timing signals received from the control unit 400 and are described below in Table 2.

TABLE 2

| | |
|---|---|
| Pulse Width Signal | Includes information regarding length of the pulse width of a signal |
| Edge Time Signal | Includes offset time information for the leading edge or trailing edge of a pulse signal |
| Edge Selected Signal | Includes information regarding whether leading edge or trailing edge of a pulse signal is selected |
| Frame Rate Signal | Includes information regarding frequency of the illumination for the LEDs and displays |

Using the above timing signals in Table 2 and the current UTC time signal 616 generated by the UTC timing module 605, the timing logic 612 of the user input and display module 610 may generate: (1) a first timing LED start time signal 613, (2) a pulse width signal 614, and (3) a center timing LED UTC time matching signal 633. As recited above, the pulse width signal 614 may transmit information regarding the duration of the on-time lighting of the LEDs, IR LEDs, and displays (i.e., duration of light integration). The first timing LED start time signal 613 may include information regarding the illumination of the first LED from a series of multiple timing LEDs 320 and timing IR LEDs 330. This first timing LED start time signal 613 can also be used to help determine the on-time lighting periods for the remaining timing LEDs 320 and timing IR LEDs 330. The center timing LED UTC time matching signal 633 may include UTC timing information for the start/end of light integration of the center timing LED 322 and the center timing IR LED 332. The center timing LED UTC time matching signal 633 may also be generated based on the current UTC time signal 616 derived from the UTC timing logic module 605 in order to display the start or end of light integration in UTC time.

FIG. 6 also shows that the shutter timing test source 300 may also comprise an LED and UTC output module 615. The LED and UTC output module 615 may be configured to illuminate the timing LEDs 320, BCD LEDs 325, timing IR LEDs 330, and BCD IR LEDs 335 for purposes of determining the beginning or end of light integration of a camera under test. The LED and UTC output module 615 may also regulate the illumination of these LEDs and IR LEDs at various time intervals, based on various input signals such as the clock signal 609, current UTC time signal 616, first timing LED start time signal 613, and pulse width signal 614.

Importantly, the LED and UTC output module 615 may also be configured to show UTC time in the UTC time display 305. In a preferred embodiment, the displayed UTC time on the UTC time display 305 may be synchronized with the illumination of the center timing LED 322 and the center timing IR LED 332. In this manner, the UTC time displayed on the UTC time display 305 represents the offset time for the leading edge or trailing edge of the center timing LED output signal, which may control the illumination of the center timing LED 322 and the center timing IR LED 332.

By way of example, one embodiment of the LED and UTC output module 615 may comprise a comparator 617, an output controller 618, and a UTC time display 305. The comparator 617 may receive both the current UTC time signal 616 and the first timing LED start time signal 613 and may generate, based on these two signals, a start output signal 619 for the output controller 618. The start output signal 619 may transmit timing information as to when the timing LEDs 320 and timing IR LEDs 330 begin or stop illuminating. In particular, when the leading edge of the edge select toggle switch 410 of the control unit 400 is selected, the start output signal 619 may transmit UTC timing information as to the time when the timing LEDs 320 and timing IR LEDs 330 begin illuminating (i.e., beginning of light integration, leading edge of pulse signal). Alternatively, when the trailing edge of the edge select toggle switch 410 is selected, the start output signal 619 may transmit UTC timing information as to the time when the timing LEDs 320 and timing IR LEDs 330 stop illuminating (i.e., end of light integration, trailing edge of pulse signal).

In addition to the start output signal 619, the output controller 618 may also receive the pulse width signal 614 from the timing logic 612. Given the pulse width signal 614 and the start output signal 619, the output controller 618 may be able to determine the offset times or start times for illuminating one or more timing LEDs 320 and timing IR LEDs 330. As a result, the output controller 618 may also generate multiple LED start time signals 631 to regulate the illumination of one or more timing LEDs 320 and timing IR LEDs 330. In this manner, each LED start time signal 631 may comprise a pulse waveform that follows consecutively and sequentially from one another (as shown in FIG. 7), such that the leading edge of each LED start time signal may be aligned with the trailing edge of the preceding LED start time signal. To help increase correction and timing accuracy for the LED start time signals 631, a clock signal 609 may also be used in conjunction with the output controller 618.

FIG. 6 also shows that both the timing logic 612 and the output controller 618 are in communication with the UTC time display 305. Here, the timing logic 612 may transmit to the UTC time display 305 a center LED UTC time matching signal 633, which may carry UTC time information synchronized with the leading edge or trailing edge of the LED start time signal for the center timing LED 322 and the center timing IR LED 332. Additionally, the output controller 618 may transmit a center LED on signal 632 to activate the UTC time display 305 whenever the center timing LED 322 and the center timing IR LED 332 illuminate. In this manner, using the timing logic 612 and output controller 618, the UTC time display 305 may depict the UTC time when the center timing LED 322 and the center timing IR LED 332 begin to illuminate (i.e., start of light integration) or stops illuminating (i.e., end of light integration).

FIG. 6 also shows that the output controller 618 may be in communication with the BCD LEDs 325 and BCD IR LEDs 335. As recited above, the BCD LEDs 325 and BCD IR LEDs 335 may be configured to illuminate the UTC time value shown in the UTC time display 305 in BCD format. In other words, the BCD LEDs 325 and BCD IR LEDs 335 may display in BCD format the UTC time when the center timing LED 322 and the center timing IR LED 332 illuminate. This will allow the user to verify the time stamp inserted in the video data by matching the UTC time when light integration occurs. In one embodiment, the BCD LEDs 325 and BCD IR LEDs 335 may be grouped into four LEDs per group as 4-bit LEDs, as shown in FIGS. 2 and 3.

a

In various embodiments, the UTC time display 305, edge time display 310, and/or pulse width display 315 may comprise one or more seven segment displays. For instance, in one embodiment shown in FIGS. 2 and 3, the UTC time display 305 may comprise seven segment digital displays—i.e., a single seven segment digital display for displaying a second unit of time (i.e., a first seven segment digital display), three seven segment digital displays capable of displaying a millisecond unit of time (i.e., a second, third, and fourth seven segment digital display), and three additional seven segment digital displays capable of depicting a microsecond unit of time (i.e., a fifth, sixth, and seventh seven segment digital displays).

Figure 7A:
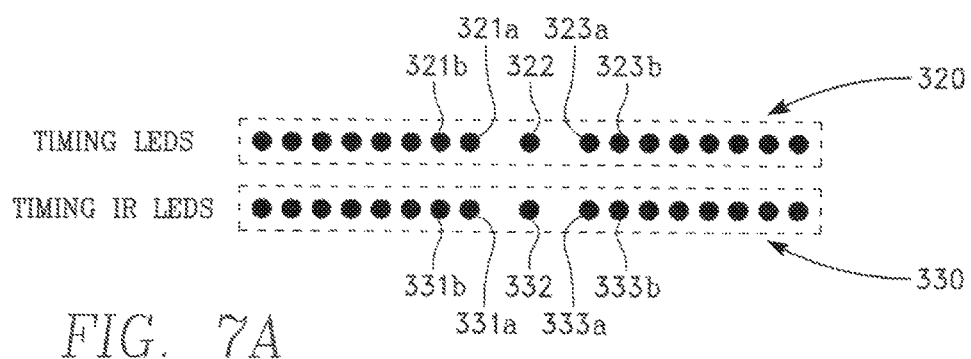
FIGS. 7A and 7B are illustrations of the some embodiments of the timing LEDs, timing IR LEDs, and LED start time signals and show the timing relationship of these timing LEDs, timing IR LEDs, and LED start time signals.
Figure 7B:
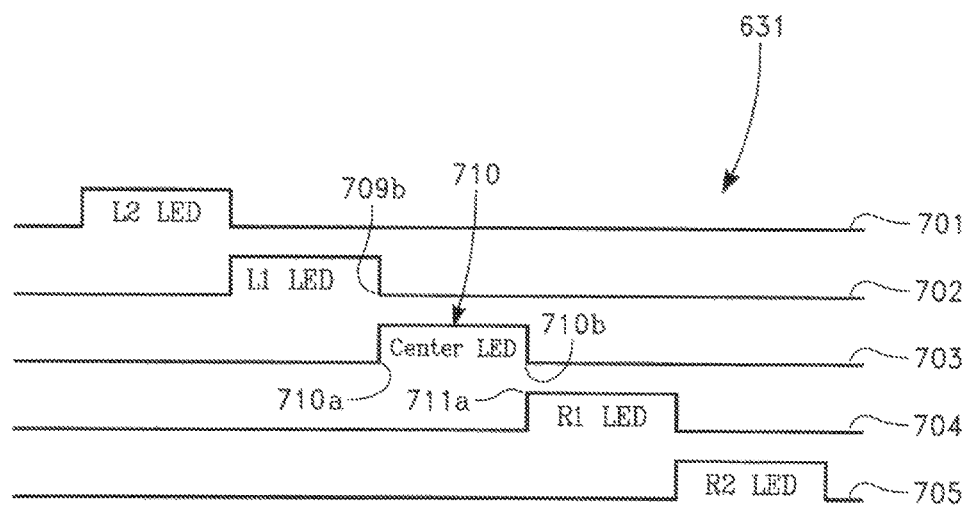

FIGS. 7A and 7B are illustrations of some embodiments of the timing LEDs, timing IR LEDs, and LED start time signals and show the timing relationship of these timing LEDs, timing IR LEDs, and LED start time signals. Specifically, FIG. 7A shows the timing LEDs 320, including: left timing LEDs 321*a*, 321*b*, center timing LED 322, and right timing LEDs 323*a*, 323*b*. Left timing LED 321*a* and right timing LED 323*a* are adjacent to center timing LED 322.

FIG. 7A also shows the timing IR LEDs 330, including: the left timing IR LEDs 331*a*, 331*b*, center timing IR LED 332, and right timing IR LEDs 333*a*, 333*b*. Left timing IR LED 331*a* and right timing IR LED 333*a* are adjacent to center timing LED 332.

Finally, FIG. 7B shows the LED start time signals 701, 702, 703, 704, 705.

FIGS. 7A and 7B show one embodiment of the timing relationship for the timing LEDs 320, timing IR LEDs 330, and LED start time signals 701, 702, 703, 704, 705. First of all, when a user adjusts the settings of the control unit 400 to match the light integration time of a camera with the illumination of the center timing LED 322 and center timing IR LED 332, the LED start time signal 701 may correspond with the illumination of first left timing LED 321*b* and first left timing IR LEDs 331*b*. Additionally, LED start time signal 702 may correspond with the illumination of the second left timing LED 321*a* and second left timing IR LED 331*a* while LED start time signal 703 may correspond with the illumination of center timing LED 322 and center timing LED 332. LED start time signal 704 may correspond with the illumination of first right timing LED 323*a* and first right timing IR LED 333*a*, and LED start time signal 705 may correspond with the illumination of second right timing 323*b* and second right timing IR LED 333*b*. Although FIG. 7B shows five LED start time signals, additional start time signals may be used without deviating from the scope of disclosure.

Importantly, FIG. 7B shows that the offset times of the pulse waveforms for each LED start time signals 701, 702, 703, 704, 705 may occur sequentially and successively, such that the timing LEDs 320 and timing IR LEDs 330 illuminate in a consecutive manner. In particular, the leading and trailing ends of the pulse waveforms for each LED start time signals 701, 702, 703, 704, 705 may align with one another successively. In this manner, the LED start time signals 701, 702, 703, 704, 705 may illuminate the timing LEDs 320 and timing IR LEDs 330 in sequential order. By way of example, as shown in FIGS. 7A and 7B, LED start time signal 701 may include a pulse width waveform that begins illuminating the first left timing LED 321*b* and first left timing IR LEDs 331*b*. At the trailing end of the pulse width waveform of LED start time signal 701, the pulse width waveform of LED start time signal 702 may begin to illuminate the second left timing LED 321*a* and second left timing IR LED 331*a*. At the trailing end of the pulse width waveform of LED start time signal 702, LED start time signal 703 may then begin illuminating the center timing LED 322 and center timing IR LED 332. LED start time signal 704 may then illuminate the first right timing LED 323*a* and first right timing IR LED 333*a* thereafter. Finally, LED start time signal 705 may illuminate the second right timing LED 323*b* and second right timing IR LED 333*b*.

In one implementation, adjusting the offset time to illuminate the center timing LED 322 and center timing IR LED 332 may be configured by the user to indicate either the start of integration time or the end of integration time. Here, as the trailing edge 709*b* of LED start time signal 702 completes illuminating first left timing 321*b* and first left timing IR LEDs 331*b*, the leading edge 710*a* of LED start time signal 703 may begin to illuminate the center timing LED 322 and center timing IR LED 332. At this time, light integration begins, and the user may note the UTC time on the UTC time display 305 if the leading edge is selected. Conversely, as the trailing edge 710*b* of LED start time signal 703 completes the illumination of the center timing LED 322 and center timing IR LED 332, the leading edge 711*a* of LED start time signal 704 may begin to illuminate the first right timing LED 323*a* and first right timing IR LED 333*a*. At this time, light integration ends and the user may note the UTC time on the UTC time display 305 if the trailing edge is selected. As such, the UTC time an the UTC time display 305 may indicate when both the center timing LED 322 and center timing IR LED 332 began illuminating at the start of integration time and may display the UTC time when the center timing LED 322 and center timing IR LED 332 stops illumination at the end of integration time. The pulse width display 315 may indicate the length of time each of the timing LEDs 320 and timing IR LEDs 330 begin illuminating.

While the foregoing written description enable one of ordinary skill to make and use what is considered presently to be the best mode thereof, those of ordinary skill will understand and appreciate the existence of variations, combinations, and equivalents of the specific embodiment, method, and examples herein. The components, steps, features, objects, benefits, and advantages that have been discussed are merely illustrative, and none of them, nor the discussions relating to them, are intended to limit the scope of protection in any way. Numerous other embodiments are also contemplated, including embodiments that have fewer, additional, and/or different components, steps features, objects, benefits, and advantages. The components and steps may also be arranged and ordered differently.

The foregoing description or the preferred embodiment has been presented for the purposes of illustration and description. While multiple embodiments are disclosed, still other embodiments will become apparent to those skilled in the art from the above detailed description. As will be realized, the scope of protection is capable of modifications in various obvious aspects, all without departing from the spirit and scope of the present disclosure. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A video timing test equipment for measuring light integration time of a camera under test, comprising:
   control unit capable of generating a plurality of input timing signals adjustable by a user; and
   a shutter timing test unit operatively coupled to said control unit, said shutter timing test unit comprising:
      plurality of timing light emitting diodes (LEDs), including: at least one left timing LED, a center timing LED, and at least one right timing LED; and
      an output controller capable of regulating an illumination of said plurality of timing LEDs by generating a plurality of timing LED output signals, each having an offset time occurring sequentially and corresponding to an associated one of said plurality of timing LEDs;
      wherein said plurality of timing LED output signals are adjusted by said user based on said plurality or input timing signals and include a center timing LED output signal associated with said illumination of said center timing LED; and
      wherein said output controller is configured to:
         i) illuminate said center timing LED based on said offset time of said center timing LED output signal;
         ii) illuminate said at least one left timing LED before said illumination of said center timing LED; and
         iii) illuminate said at least one right timing LED after said illumination of said center timing LED.

2. The video timing test equipment according to claim 1, wherein said shutter timing test unit further comprises:
   a coordinated universal time (UTC) time display in communication with said output controller
   a UTC timing module capable of generating a current UTC time signal; and
   timing logic capable of generating a center timing LED UTC time matching signal based on said current UTC time signal and said plurality of input timing signals;
   wherein said output controller is capable of displaying on said UTC time display a UTC time based on said center timing LED UTC time matching signal, said UTC time corresponding to a UTC start time or a UTC end time of said light integration.

3. The video timing test equipment, according to claim 2, wherein said shutter timing test unit further comprises:
   a plurality of binary coded decimal (BCD) LEDs in communication with said output controller; and
   wherein said output controller is capable of displaying said UTC time in BCD format with said plurality of BCD LEDs.

4. The video timing test equipment, according to claim 3, wherein said shutter timing test unit further comprises:
   a plurality of BCD infrared light emitting diodes (IR LEDs) in communication with said output controller;
   wherein said output controller is capable of displaying said UTC time in BCD format with said plurality of BCD IR LEDs.

5. The video timing test equipment according to claim 1, wherein said shutter test unit further comprises:
   a user input display logic; and
   an edge time display in communication with said user input display logic;
   wherein said user input display logic is capable of displaying said offset time of said center timing LED on said edge time display based on said plurality of input timing signals.

6. The video timing test equipment according to claim 3, wherein said shutter timing test unit further comprises:
   a pulse width display in communication with said user input display logic;
   wherein said user input display logic is capable of displaying a pulse width time on said pulse width display based on said plurality of input timing signals.

7. The video timing test equipment, according to claim 1, wherein said shutter timing test unit further comprises:
   a plurality of timing IR LEDs, including at least one left timing IR LED, a center timing IR LED, and at least one right timing IR LED;
   wherein said output controller is capable of regulating an illumination of said plurality of dining IR LEDs based on said plurality of timing LED output signals, such that said output controller is configured to:
      i) illuminate said center timing IR LED based on said offset time of said center timing LED output signal;
      ii) illuminate said at least one left timing IR LED before said illumination of said center timing IR LED; and
      iii) illuminate said at least one right timing IR LED after said illumination of said center timing IR LED.

8. The video timing test equipment of claim 1, wherein said control unit comprises a toggle switch moveable between a start position and an end position, said start position being associated with a leading edge of said center timing LED output signal and said end position being associated with a trailing edge of said center timing LED output signal, such that said start position corresponds to a start of light integration and said end position corresponds to an end of said light integration.

9. A video timing test equipment for measuring light integration time of a camera under test, comprising:
   a control unit capable of generating a plurality of input timing signals adjustable by a user; and
   a shutter timing test unit operatively coupled to said control unit, said shutter timing test unit comprising:
      a plurality of timing LEDs, including: at least one left timing LED, a center timing LED, and at least one right timing LED;
      a timing logic capable of generating a first timing LED start time signal and a pulse width signal, based on said plurality of input timing signals;
      wherein said first timing LED start time signal corresponds to a start time as to when a first of said plurality of timing LEDs begins to illuminate and wherein said pulse width signal corresponds to a time period for illuminating each of said plurality of timing LEDs;
      an output controller capable of regulating an illumination of said plurality of timing LEDs by generating a plurality of timing LED output signals, each having an offset time occurring sequentially and corresponding to an associated one of said plurality of timing LEDs, said plurality of timing LED output signals being adjusted based on: (1) said first timing LED start time signal and (2) said pulse width signal and including a center timing LED output signal associated with said illumination of said center timing LED;
      wherein said output controller is configured to:
         i) illuminate said center timing LED based on said offset time of said center timing LED output signal;
         ii) illuminate said at least one left timing LED before said illumination of said center timing LED; and
         iii) illuminate said at least one right timing LED after said illumination of said center timing LED.

10. The video timing test equipment according to claim 9, wherein said shutter timing test unit further comprises:
    UTC timing module capable of generating a current UTC time signal; and
    a UTC time display in communication with said output controller;
    wherein said timing logic is capable of generating a center timing LED UTC time matching signal based on said current UTC time signal and said plurality of input timing signals; and
    wherein said output controller is capable of displaying on said UTC time display a UTC time based on said center timing LED UTC time matching signal, said UTC time corresponding to a UTC start time or a UTC end time of said light integration.

11. The video timing test equipment, according to claim 10, wherein said shutter timing unit further comprises:
    a plurality of timing IR LEDs, including at least one left timing IR LED, a center timing IR LED, and at least one right timing IR LED;
    wherein said output controller is capable of regulating an illumination of said plurality of timing IR LEDs based on said plurality of timing LED output signals, such that said output controller is configured to:
       i) illuminate said center timing IR LED based on said offset time of said center timing LED output signal;
       ii) illuminate said at least one left timing IR LED before said illumination of said center timing IR LED; and
       iii) illuminate said at least one right timing IR LED after said illumination of said center timing IR LED.

12. The video timing test equipment, according to claim 11, wherein said shutter timing test unit further comprises:
    a plurality of BCD LEDs in communication with said output controller; and
    wherein said output controller is capable of displaying said UTC time in BCD format with said plurality of BCD LEDs.

13. The video timing test equipment, according to claim 11, wherein said shutter timing test unit farther comprises:
    plurality of BCD IR LEDs in communication with said output controller;
    wherein said output controller is capable of displaying said UTC time in BCD format using said plurality of BCD IR LEDs.

14. The video timing test equipment according to claim 9, wherein said shutter timing test unit farther comprises:
    a user input display logic; and
    an edge time display in communication with said user input display logic;
    wherein said user input display logic is capable of displaying said offset time of said center timing LED on said edge time display based on said plurality of input timing signals.

15. The video timing test equipment according to claim 9, wherein said shutter timing test unit further comprises:

a pulse width display in communication with said user input display logic;

wherein said user input display logic is capable of displaying a pulse width time on said pulse width display based on said plurality of input timing signals.

16. The video timing test equipment of claim 9, wherein said control unit comprises a toggle switch movable between a start position and an end position, said start position being associated with a leading edge of said center timing LED output signal and said end position being associated with a trailing edge of said center timing LED output signal, such that said start position corresponds to a start of light integration and said end position corresponds to an end of said light integration.

17. A method for measuring light integration time of a camera under test with a video timing test equipment, comprising:

providing a video timing test equipment having a control unit and a shutter timing test unit;

wherein said control unit is capable of generating a plurality of input timing signals adjustable by a user and comprises: (1) a toggle switch and (2) at least one rotary control knob;

wherein said toggle switch is selectable between a start of light integration and an end of light integration and wherein said at least one rotary control knob is used to adjust an offset time of said start and said end of light integration;

wherein said shutter timing test unit is operatively coupled to said control unit and comprises:

a plurality of timing LEDs, including: at least one left timing LED, a center timing LED, and at least one right timing LED; and an output controller capable of regulating an illumination of said plurality of timing LEDs by generating a plurality of timing LED output signals, each having an offset time increasing successively and corresponding to an associated one of said plurality of timing LEDs, said plurality of timing LED output signals being adjusted based on said plurality of input timing signals and includes a center timing LED output signal associate with said illumination of said center timing LED;

wherein said output controller is configured to:
i) illuminate said center timing LED based on said offset time of said center timing LED output signal;
ii) illuminate said at least one left timing LED before said illumination of said center timing LED; and
iii) illuminate said at least one right timing LED after said illumination of said center timing LED;

positioning said shutter timing test unit in view of a camera under test, such that, a monitor in video communication with said camera under test displays a video image of said timing LEDs of said shutter timing test unit;

adjusting said toggle switch of said control unit to select said start of light integration; and while viewing said timing LEDs on said monitor, adjusting said at least one control knob of said control unit until said at least one left timing LED stops illuminating and said center timing LED illuminates in order to measure said start of said light integration.

18. The method for measuring light integration time of claim 17, further comprising the steps:

adjusting said toggle switch of said control unit to select said end of said light integrations; and while viewing said timing LEDs on said monitor, adjusting said at least one control knob of said control unit until said at least said center timing LED illuminates and said at least one right timing LED stops illuminating in order to determine said end of light integration.

19. The method for measuring light integration time of claim 18, wherein said shutter timing test unit further comprises a UTC time display;

wherein said UTC time display depicts a UTC start time when selecting said start of said light integration with said control unit; and wherein said method further comprising the steps:
adjusting said toggle switch of said control unit to select said start of light integration; and
verifying that a UTC time overlay displayed on said monitor and generated by said camera under test is substantially identical to said UTC start time depicted on said UTC time display of said shutter timing test unit.

20. The method for measuring light integration time of claim 19, wherein said UTC time display depicts a UTC end time when selecting said end of light integration with said control unit; and wherein said method further comprising the steps:
adjusting said toggle switch of said control unit to select said end of light integration; and
verifying that a UTC time overlay displayed on said monitor and generated by said camera under test is substantially identical to said UTC end time depicted on said UTC time display of said shutter timing test unit.

* * * * *